US009619478B1

(12) United States Patent
Singh et al.

(10) Patent No.: US 9,619,478 B1
(45) Date of Patent: Apr. 11, 2017

(54) METHOD AND SYSTEM FOR COMPRESSING LOGS

(71) Applicant: EMC Corporation, Hopkinton, MA (US)

(72) Inventors: Pranay Singh, Cupertino, CA (US); Srikanta Shivanna, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

(21) Appl. No.: 14/132,894

(22) Filed: Dec. 18, 2013

(51) Int. Cl.
G06F 17/00 (2006.01)
G06F 17/30 (2006.01)

(52) U.S. Cl.
CPC .............................. *G06F 17/30153* (2013.01)

(58) Field of Classification Search
CPC ................................................ G06F 17/30153
USPC ......................................................... 707/693
See application file for complete search history.

(56) References Cited

U.S. PATENT DOCUMENTS

| 7,493,224 B2* | 2/2009 | Levine ................ G06F 11/3466 340/500 |
| 7,725,298 B2* | 5/2010 | Levine ................ G06F 11/3466 340/679 |
| 7,778,979 B2* | 8/2010 | Hatonen ............. G06F 11/3466 707/664 |
| 2005/0240582 A1* | 10/2005 | Hatonen ........... G06F 17/30539 |
| 2011/0179341 A1* | 7/2011 | Falls ................... H03M 7/3086 714/807 |
| 2014/0269769 A1* | 9/2014 | Gresham ................ H04L 69/28 370/474 |

OTHER PUBLICATIONS

Aharon, Michal, et al., "One Graph Is Worth a Thousand Logs: Uncovering Hidden Structures in Massive System Event Logs", ECML PKDD 2009 Part I, LNAI 5781, Springer-Verlag, Berlin, Germany, © 2009, pp. 227-243.*

Narayanasamy, Satish, et al., "Automatic Logging of Operating System Effects to Guide Application-Level Architecture Simulation", SIGMetrics/Performance '06, St. Malo, France, Jun. 26-30, 2006, pp. 216-227.*

(Continued)

*Primary Examiner* — Robert Stevens
(74) *Attorney, Agent, or Firm* — Blakely, Sokoloff, Taylor & Zafman LLP

(57) ABSTRACT

A computer-implemented method to compress log messages is disclosed. The method starts with maintaining a log reference table having a plurality of log reference entries, each containing a string of characters to be recited repeatedly during logging of messages. In response to a request for logging a log message initiated from an application, the method creates a compressed log message entry in a compressed log file. The compressed log message entry includes: a time stamp indicating the time the log message being created; a log reference identifier identifying one of the plurality of log reference entries without reciting a corresponding string of characters of the log reference entry, where the one of the plurality of log reference entries contains one or more variable indications; and a log variable portion associated with the log message, where the log variable portion contains a part of the log message.

20 Claims, 9 Drawing Sheets

(56) References Cited

OTHER PUBLICATIONS

Wang, Haixun, et al., "A Fast Algorithm for Subspace Clustering by Pattern Similarity", SSDBM '04, IEEE Computer Society, © 2004, pp. 51-60.*

Skibiński, Przemyslaw, et al., "Fast and efficient log file compression", Local Proceedings of ADBIS 2007, Technical University of Varna, © 2007, pp. 56-69.*

Lomet, David, et al., "Transaction Time Indexing with Version Compression", PVLDB '08, Auckland, New Zealand, Aug. 23-28, 2008, pp. 870-881.*

* cited by examiner

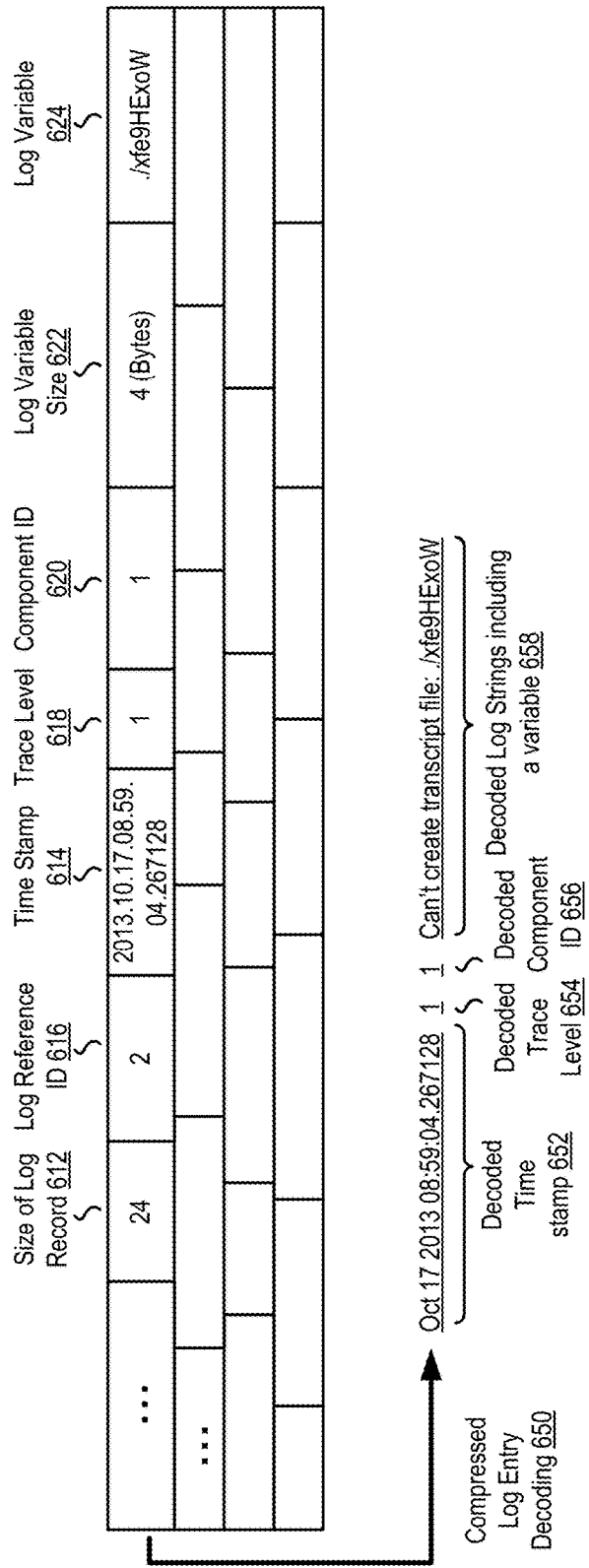

FIG. 7A

| Log Reference ID 702 | Log Strings 704 |
|---|---|
| ... | ... |
| 124 | Sendmail [INT]: Can't create transcript file STR: Permission Denied |
| ... | ... |

FIG. 7B

| Size of Log Record 710 | Log ID 712 | Time Stamp 714 | Log Reference ID 716 | Log Variable Type 718 | Log Variable Value 720 | Log Variable Type 722 | Log Variable Value 724 |
|---|---|---|---|---|---|---|---|
| 28 | 25 | 2013.10.17.08.59.04.267128 | 124 | INT (4 Bytes) | 21601 | 12 (Bytes) | ./xfe9HExoW |
| ... | ... | | | | | | |

Compressed Log Entry Decoding 750

25: Oct 17 2013 08:59:04.267128 Sendmail [2160]: Can't create transcript file: ./xfe9HExoW: Permission Denied

- Decoded Log ID 751
- Decoded Time stamp 752
- Decoded Log Strings including variables 754

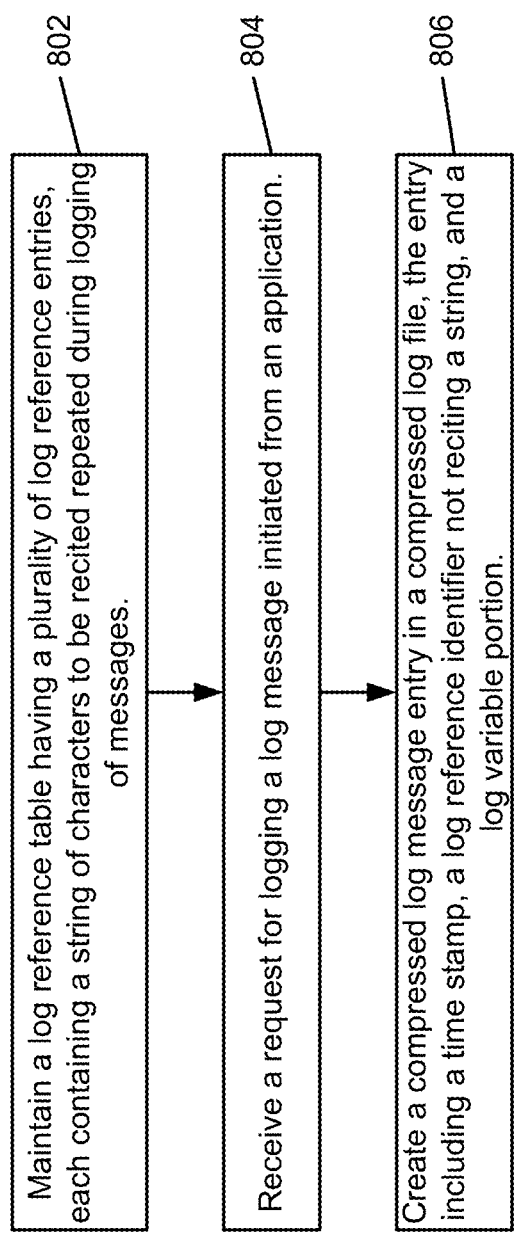

METHOD AND SYSTEM FOR COMPRESSING LOGS

FIELD OF THE INVENTION

Embodiments of the present invention relate generally to data processing. More particularly, embodiments of the invention relate to improving logging performance through compression.

BACKGROUND

In computing, a file system and applications running in the file system generate log messages. The log messages may be used by an administrator to monitor system performance, by an application developer to debug problems within an application, and/or by the administrator/application developer/a third party to root-cause issues leading to system outage. Log messages are stored in log files, and log files can be very large due to the length of log messages. When a log file becomes large and constrained by storage space, the log file needs to be updated frequently by overwriting older log messages with newer log messages to remain within the allocated storage space. The frequent overwriting makes the log file less valuable in tracking system performance or troubleshooting system issues. Also, when the log file becomes large, it is harder to transfer the log file from one system to another as it takes more storage space to store and more network bandwidth and transmission time to transfer. Thus it is desirable to reduce the size of log files.

BRIEF DESCRIPTION OF THE DRAWINGS

Embodiments of the invention are illustrated by way of example and not limitation in the figures of the accompanying drawings in which like references indicate similar elements.

FIG. 6A is a block diagram illustrating a log reference table according to one embodiment of the invention.

FIG. 6B is a block diagram illustrating encoding and decoding a log entry according to one embodiment of the invention.

FIG. 7A is another block diagram illustrating a log reference table according to one embodiment of the invention FIG. 7B is another block diagram illustrating encoding and decoding a log entry according to one embodiment of the invention.

FIG. 8 is a flow diagram illustrating a log compression process according to one embodiment of the invention.

DETAILED DESCRIPTION

Figure 1:
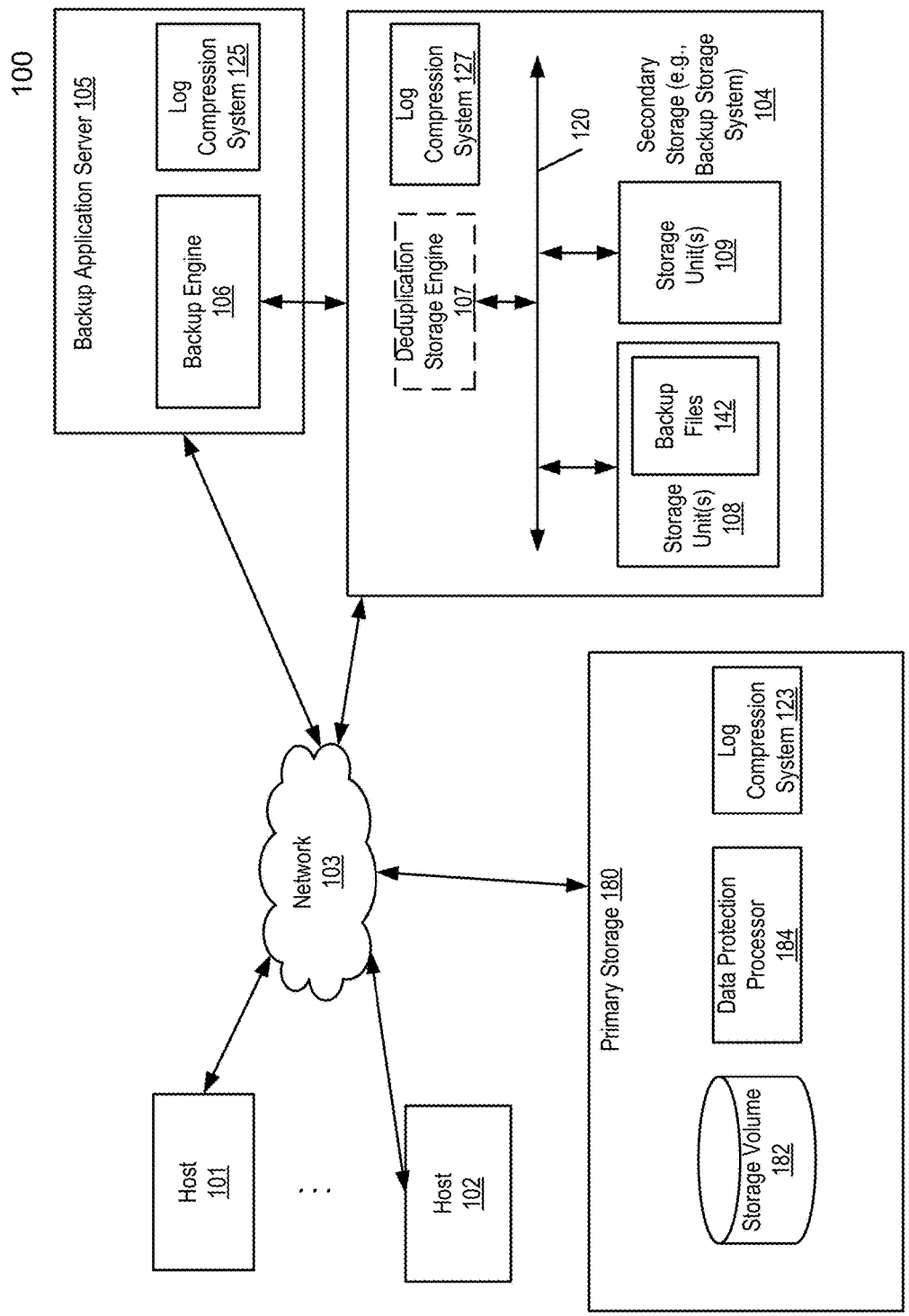
FIG. 1 is a block diagram illustrating a system for backup incorporating log compression according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a computer-implemented method can be utilized to compress log messages. The method starts with maintaining a log reference table having a plurality of log reference entries, each containing a string of characters to be recited repeatedly during logging of messages that are generated from an application during its execution. In response to a request for logging a log message initiated from the application, the method creates a compressed log message entry in a compressed log file. The compressed log message entry includes: a time stamp indicating the time the log message being created; a log reference identifier identifying one of the plurality of log reference entries without reciting a corresponding string of characters of the log reference entry, where the one of the plurality of log reference entries contains one or more variable indications; and a log variable portion associated with the log message, where the log variable portion contains a part of the log message.

According to some embodiments, a log compression system can be utilized to compress log messages. The log compression system includes a log reference table configured to have a plurality of log reference entries, each containing a string of characters to be recited repeatedly during logging of messages that are generated from an application during its execution. The log compression system also includes a compressed log file configured to store compressed logs of the log compression system. The log compression system further includes a log encoder, in response to a request for logging a log message initiated from the application, configured to create a compressed log message entry in the compressed log file. The compressed log message entry includes: a time stamp indicating the time the log message being created; a log reference identifier identifying one of the plurality of log reference entries without reciting a corresponding string of characters of the log reference entry, where the one of the plurality of log reference entries contains one or more variable indications; and a log variable portion associated with the log message, where the log variable portion contains a part of the log message.

FIG. 1 is a block diagram illustrating a system for backup incorporating log compression according to one embodiment of the invention. Referring to FIG. 1, system 100 includes, but is not limited to, one or more hosts 101-102 communicatively coupled to primary storage 180 and secondary storage 104 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both primary and secondary storage systems 180 and 104 may include any type of server or cluster of servers. For example, they may be storage servers used for any of various different purposes, such as to provide multiple users with access to shared data and/or to back up mission critical data. They may be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. Both primary and secondary storage systems 180 and 104 may have a distributed architecture, or all of their components may be integrated into a single unit. Both primary and secondary storage systems 180 and 104 may be implemented as part of an archive and/or backup storage system such as a de-duplication storage system available from EMC® Corporation of Hopkinton, Mass.

In one embodiment, backup application server 105 includes, but not limited to, a backup engine 106 and log compression system 125. Log compression system 125 compresses log messages generated by backup engine 106 or other processors and/or processes within backup application server 105. Backup application server 105 coordinates with backup storage system 104, primary storage 180, and hosts 101-102 to run various backup operations. Backup engine 106 may perform both backup and restore functions. In one embodiment, backup application server 105 coordinates backup and restoration operations between hosts 101/102 and primary storage 180, where the data from hosts 101/102 are backed up to and restored from storage volume 182. In another embodiment, backup application server 105 coordinates backup and restoration operations between primary storage 180 and secondary storage 104, where the data from storage volume 182 of primary storage 180 are backed up to storage units 108-109 at secondary storage 104 (sometimes primary storage 180 and secondary storage 104 are referred to as cascaded storages). Note while backup application server 105 is illustrated as a standalone apparatus in FIG. 1, in some embodiments, backup application server 105 is a module embedded within primary storage 180 or secondary storage 104.

Both primary storage 180 and secondary storage 104 may perform deduplication. The deduplication processes performed and storage units allocated are similar between primary storage 180 and secondary storage 104, thus only the processes and storage units within one of them are disclosed below for illustration. In one embodiment, secondary storage 104 may include, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Backup files 142 represent data stored in storage units 108.

In response to a data file to be stored in storage units 108-109, optional deduplication storage engine 107 is configured to segment the data blocks into multiple segments (also referred to as data chunks or simply chunks) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata may be stored in at least some of storage units 108-109, such that files can be accessed independent of another storage unit. Metadata of each storage unit includes enough information to provide access to the files it contains.

In one embodiment, the primary and secondary storage as shown in FIG. 1 each may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data management policies to achieve a cost-effective match to the current storage requirements of the data. For example, data may initially be stored in a tier of storage in a storage volume that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage, and different purpose (e.g., replication, or backup) for a tiered data storage system.

Referring to FIG. 1, backup engine 106 is configured to back up data from hosts 101-102 and to store the backed up data in one or more of storage units 108 of backup storage system 104, where the data may be deduplicated by deduplication storage engine 107. In this example, a user (e.g., an administrator) initiates a backup request, directly or through a backup schedule, of primary storage 180. Note in some embodiments, the user may request a full backup or an incremental backup, and primary storage 180 decides whether full storage volume 182 or changed data within storage volume 182 only are transferred (e.g., primary storage 180 may decide to transfer changed data only when the secondary storage has an earlier backup of the data and only changed data are needed to fully reconstruct the data at the secondary storage).

Primary storage 180 contains storage volume 182, which represents the data stored in the primary storage. Storage volume 182 may store data across a number of logical units, and each identified by a logical unit number (LUN). Each logical unit may contain a number of blocks, and each block may contain a number of sectors. Primary storage 180 also contains data protection processor 184 that manages both backup and restore processes within primary storage 180. Primary storage 180 also contains log compression system 123 that compresses log messages generated by data protection processor 184 or other processors and/or processes within primary storage 180. Similarly, secondary storage 104 contains compressed log compression system 127 that compresses log messages generated by a logging mechanism (not shown) of deduplication storage engine 107 or other processors and/or processes within secondary storage 104. The logging mechanism (or simply referred to as a logger) is configured to capture (e.g., via an application programming interface (API) or implemented as a separate layer in the storage system to intercept) certain operating events or statistics of the storage system, which may be utilized for subsequent analysis (e.g., debugging, prediction of future failures, etc.). The captured data may be stored in a log file, which may be compressed, dynamically at the point in time or subsequently offline, by log compression systems 123, 125 and 127 respectively.

Figure 2:
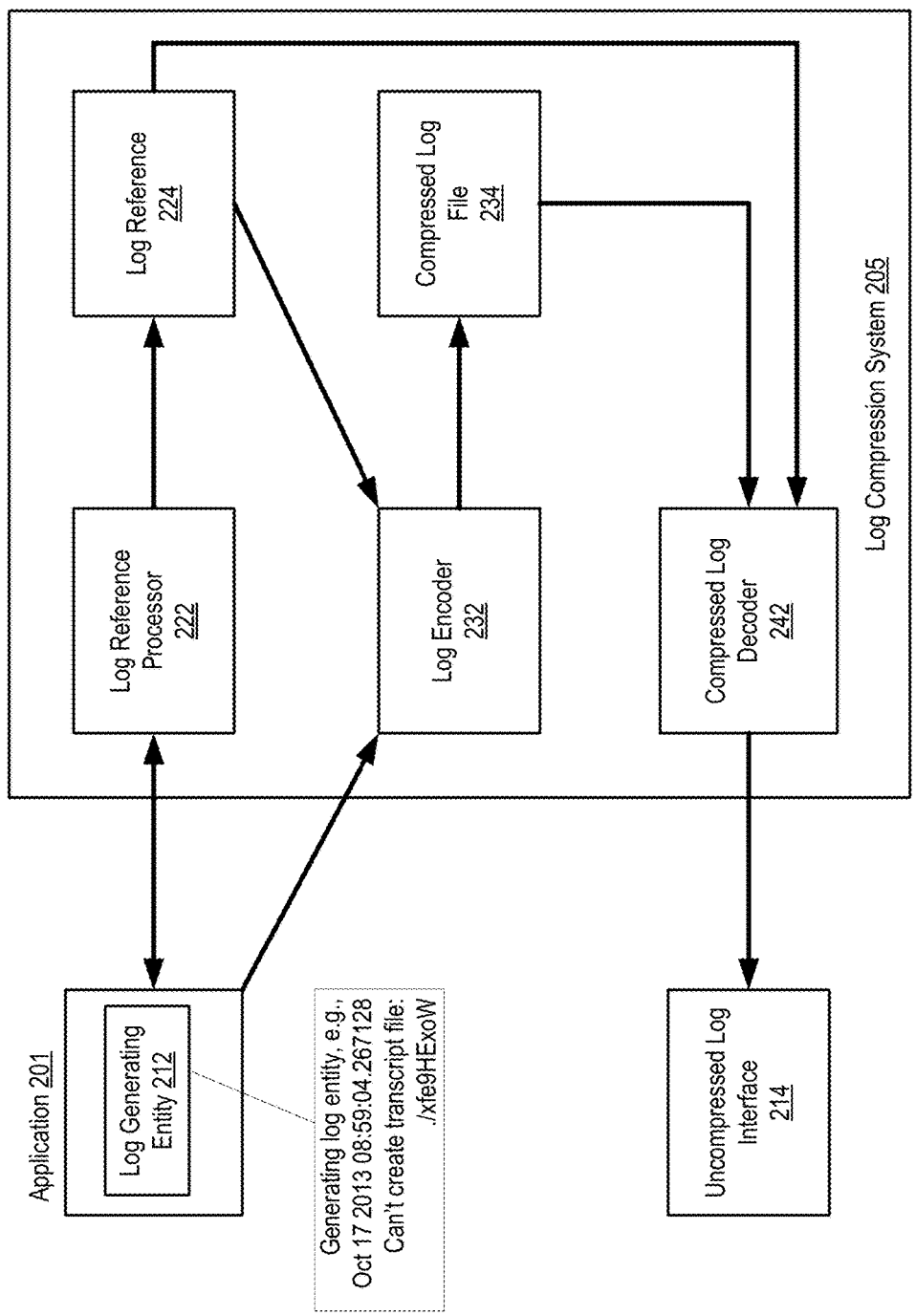
FIG. 2 is a block diagram illustrating a log compression system according to one embodiment of the invention.

FIG. 2 is a block diagram illustrating a log compression system according to one embodiment of the invention. Log compression system 205 may be implemented within primary storage 180, secondary storage 104, or backup application server 105 illustrated in FIG. 1.

Referring to FIG. 2, application 201 contains log generating entity 212, which generates one or more log messages when application 201 is processed. Application 201 may be a variety of file system applications, operating system calls, user applications/programs, or other function/processes deemed worth monitoring by the system. Note tracing, recording information about an application's execution (e.g., a computer program's execution), is considered a specialized use of logging. While software tracing (often utilized by software developers) and event logging (often utilized by system administrators) sometimes have different characteristics in their log generating entities, this specification does not distinguish them as they both may utilize embodiments of the invention to compress logs. When application 201 is executed, log generating entity 212 generates one or more log messages such as "Oct 17 2013 08:59:04.267128 Can't create transcript file: ./xfe9HExoW" as illustrated. Within the log message, "Oct 17 2013 08:59:04.267128" is a time stamp indicating when the log message is created; "Can't create transcript file:" is a string indicating the log message type; and "./xfe9HExoW" is a file name and location of the file causing the log message to be created. Without a log compression system, such log messages are then stored in a log file or displayed to a user interface directly. With log compression system 205, such log messages are compressed to a compressed log file 234 after being encoded by log encoder 232.

The encoding is based on the insight that log messages are not unique, and they generally contain portions that shared with other log messages generated by this or other applications. For example, log generating entity 212 may generate different log messages at run-time during different iterations of processing, that is, a file other than "./xfe9HExoW," may cause "Can't create transcript file" type of log message to be created. Thus, a reference to the type of log message, instead of storing the string of log message itself, may help reducing the size of a log message. The reduction of the size of log messages like this reduces the size of log file, and a log file may accumulate more log messages over a longer duration, which makes the log file more valuable to users, and it also reduces the bandwidth required and time needed to transmit such log files.

Log reference processor 222 generates one or more references for log generating entity 212. The generated references are stored in log reference 224. Log reference 224 is a data structure storing the reference information. Log reference 224 may be a table (such as a hash table), an array, tuples, or other applicable data structures. One reference entry within log reference 224 corresponds to a string of characters contained in a log message. Using the log reference 224, log encoder 232 then encodes a generated log message from executing application 201 into compressed log file 234. When log messages need to be read out, the entries within or associated with compressed log file 234 are utilized by compressed log decoder 242. Compressed log decoder 242 reads out one or more entries from compressed log file 234 and refers to log reference 224, and decompresses the one or more entries to an uncompressed log interface 214.

Note log reference processor 222, log encoder 232, and compressed log decoder 242 are illustrated as standalone units. These units may be integrated into a processor or processors to perform similar function as disclosed herein. Some units illustrated in FIG. 2 may be implemented outside of log compression system 205 (such as log reference 224 and compressed log file 234) but communicatively coupled with log compression system 205. In addition, modules illustrated outside of the log compression system 205 (such as uncompressed log interface 214) or not shown may be implemented within log compression system 205.

Figure 3:
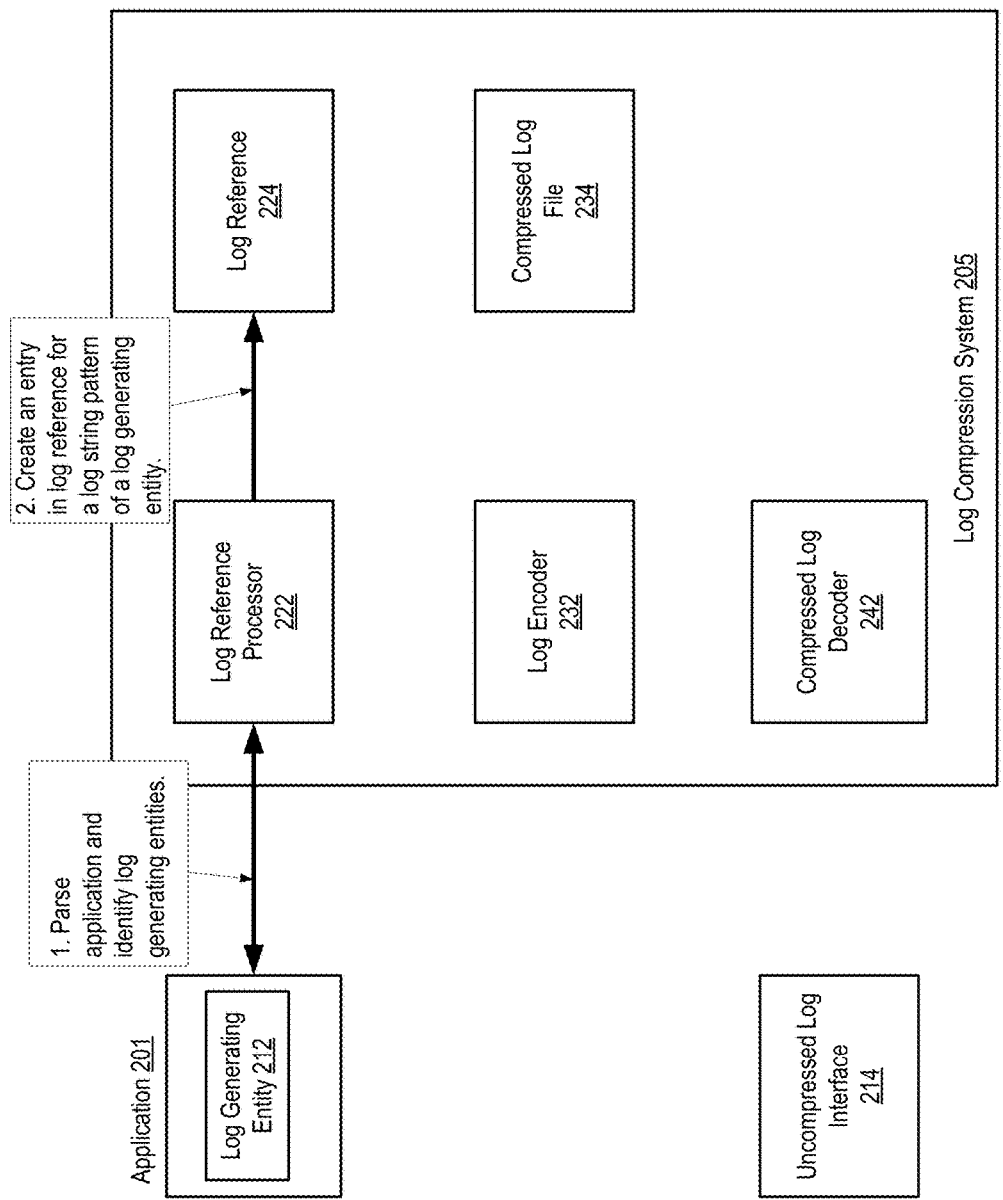
FIG. 3 is a block diagram illustrating a log reference creation process according to one embodiment of the invention.
Figure 4:
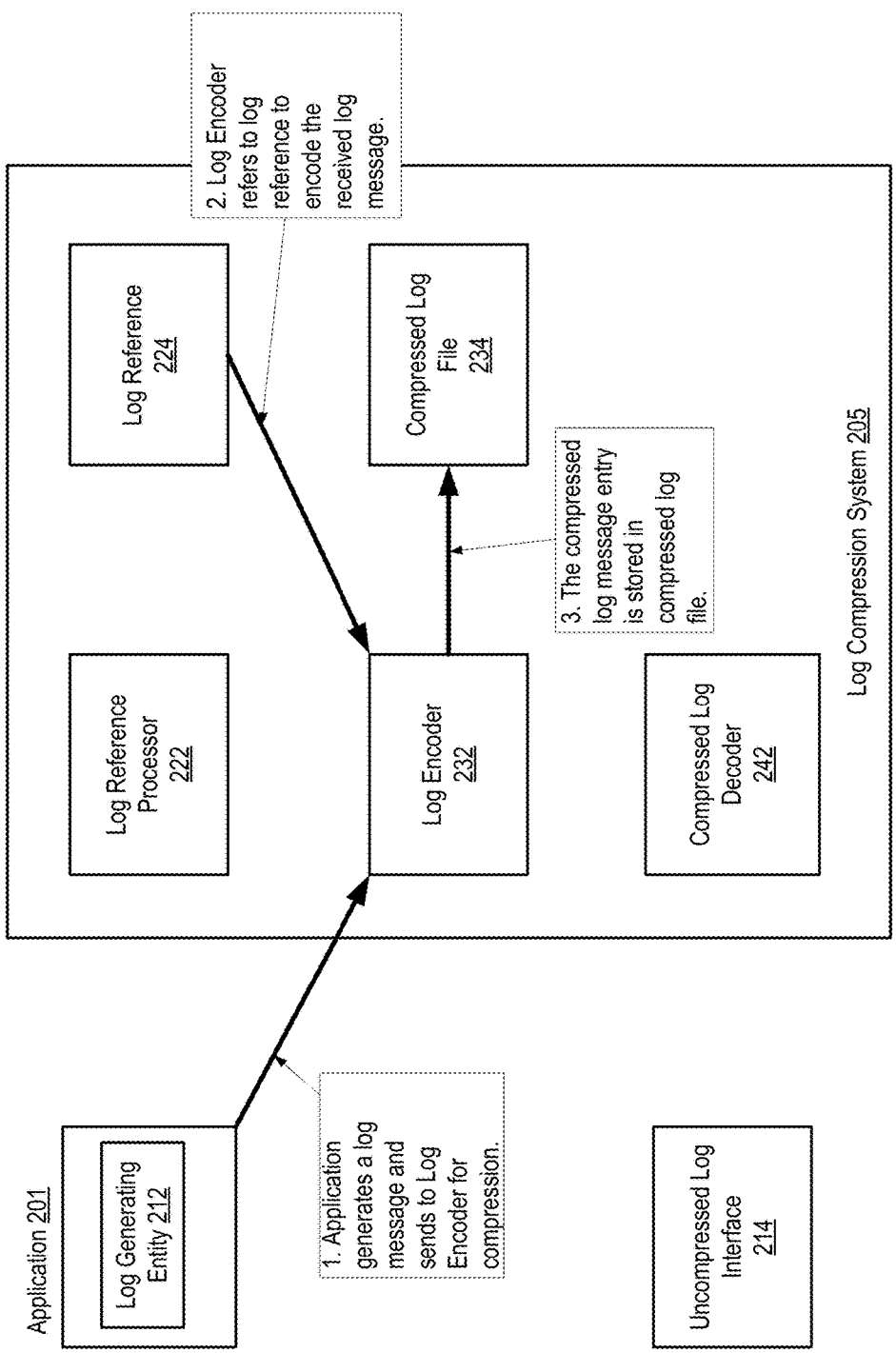
FIG. 4 is a block diagram illustrating a log compression process according to one embodiment of the invention.
Figure 5:
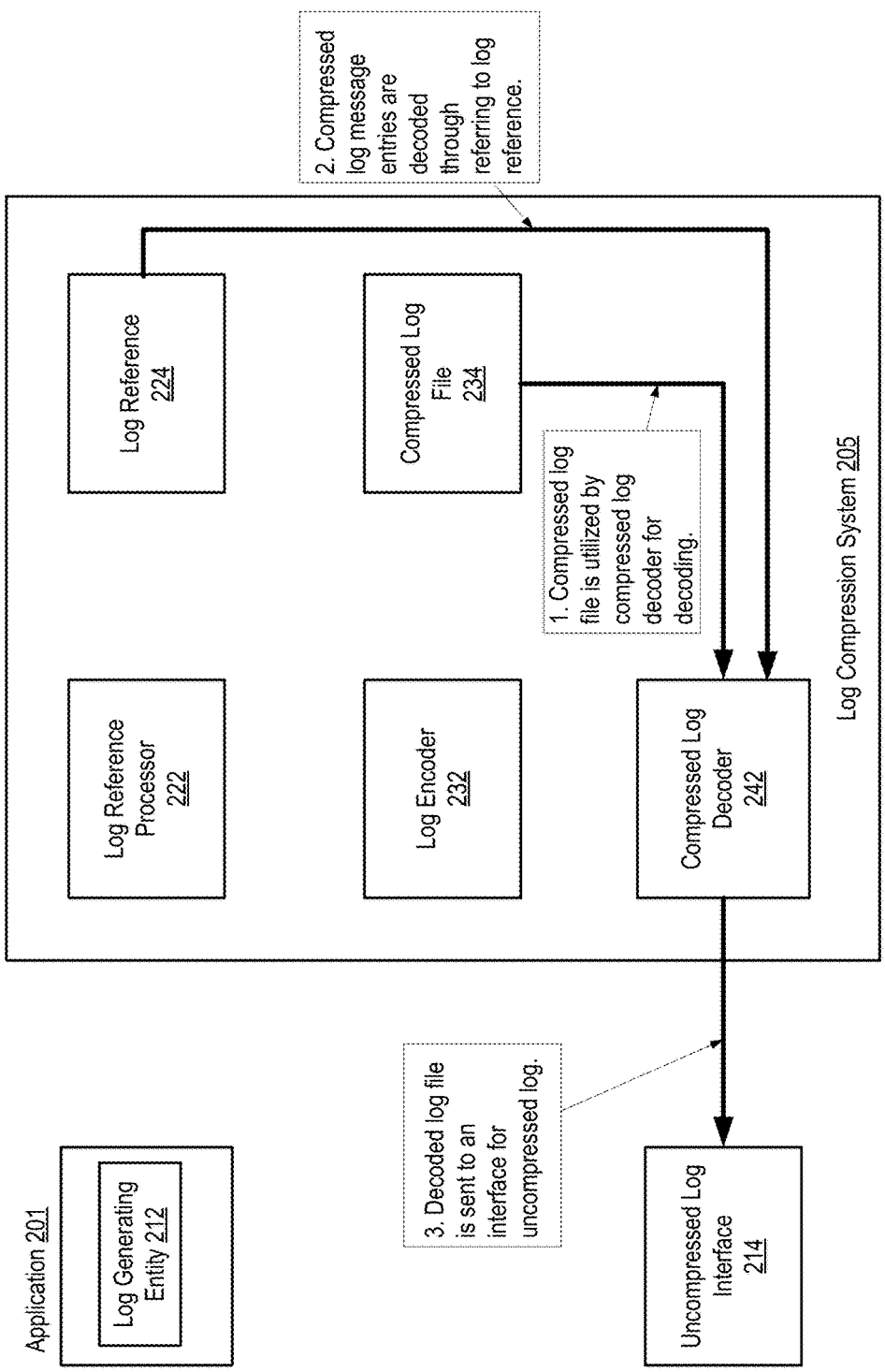
FIG. 5 is a block diagram illustrating a compressed log decoding process according to one embodiment of the invention.

The log compression operations are discussed in more details in FIGS. 3-5 with reference to FIGS. 6-7. However, it should be understood that the log compression operations can be performed by embodiments of the invention other than those discussed with reference to FIGS. 6-7.

FIG. 3 is a block diagram illustrating a log reference creation process according to one embodiment of the invention. Task boxes 1 to 2 illustrate the order in which operations are performed according to one embodiment of the invention. Log compression system 205 in FIG. 3 is the same log compression system 205 in FIG. 2 and the same or similar references indicate elements or components having the same or similar functionalities. Some connections between various entities and modules not essential to the discussion are omitted in FIG. 3 to leave space to discuss the reference creation process more clearly.

The process starts with log reference processor 222 parsing application 201 and identifying log generating entities at task box 1. Parsing an application may happen at run-time while the application is executed or it may happen at pre-process. For example, when application 201 is a user program (in C, Java, or other program languages), log reference processor 222 may parse the application at compiling stage before it is executed. Note the parsing may happen only once in the pre-process (e.g., compiling) and not repeated at run-time. Log generating entities are ones that the application has designated to be monitored by logging process. For example, in program languages, function LOG (info), logger.getLogger( ), log.INFO, log.DEBUG, and etc. may be used to designate log generating entities.

At task box 2, log reference processor 222 creates an entry in log reference 224 for a log pattern of a log generating entity. Log reference processor 222 determines a log pattern of an identified log generating entity, and adds the log pattern as an entry of the log reference if the log pattern is not already in the log reference. A log pattern is an ordered string of characters that may include one or more variables. A log reference table (a type of log reference data structure) is illustrated in FIGS. 6A and 7A respectively according to embodiments of the invention.

Referring to FIG. 6A, each entry is identified by a unique log reference identifier (ID) in the log reference table. Each unique reference ID corresponds to a log string. As illustrated at reference 604, log strings are stored as ordered strings of characters (such as texts) including variable indications. Each log string contains an ordered list of text including variable indications such as STR and INT. STR and INT are short for strings and integers. The variables indicate the log reference ID referring to a log pattern of the log generating entity including values that change in processing, and the variable values are undetermined until the processing of the application.

With variable indications inserted in the ordered strings of characters, the log strings indicate the type of data to expect at respective positions. For each variable type, the data size of the variable type is defined. For example, an integer may be of size of four bytes, a float (sometimes referred to as FL) may be of size of four bytes, a long integer (sometimes referred to as LN) may be of size of eight bytes, and a double float (sometimes referred to as DB) may be of size of eight bytes too. For variable STR, the default byte size varies, and it can be four bytes, eight bytes or longer. The log strings may contain more than one variable. In FIG. 7A, the log string with log reference ID 124 contains an ordered string including two types of variable indications, integer (INT) and string (STR). Note while FIGS. 6A and 7A illustrates log reference table, other log reference data structure (such as arrays or tuples) may be implemented in embodiments of the invention. Also note that not every one of log generating entities may have a corresponding log reference entry in one embodiment. When log reference processor 222 determines that a log generating entity does not contain a string of characters to be recited repeatedly (more than once) during logging of messages that are generated from application 201 during its execution, it ignores the log generating entity and do not generate any log reference entry. When the string of characters are not to be recited repeatedly, generating a log reference entry may not reduce log size, thus they may be ignored.

The generated log reference aids log message encoding. FIG. 4 is a block diagram illustrating a log compression process according to one embodiment of the invention. Task boxes 1 to 3 illustrate the order in which operations are performed according to one embodiment of the invention. Log compression system 205 in FIG. 4 is the same log compression system 205 in FIG. 2 and the same or similar references indicate elements or components having the same or similar functionalities. Some connections between various entities and modules not essential to the discussion are omitted in FIG. 4 to leave space to discuss the reference creation process more clearly.

The process starts at task box 1, where application 201 generates a log message from execution and the log message is utilized by log encoder 232 for compression. The log encoder refers to log reference 224 to encode the received log message at task box 2. The encoded log message is stored in compressed log file 234 as a compressed log message entry. The compressed log message entries are illustrated in FIGS. 6B and 7B according to embodiments of the invention.

FIG. 6B illustrates a compressed log message entry. Assuming that the generated log message is "Can't create transcript file: ./xfe9HExoW", the compressed log message entry in compressed log file 234 will store the information, along with other information for decoding the log entry. The compressed log message entry contains a size of log record field 612 that indicates the size in bytes of the compressed log message entry. It contains a log reference ID field indicating which log reference entry refers to the string of the log entry. In this example, the log reference ID 2 is stored, which corresponds to "Can't create transcript file: STR" in the log reference table of FIG. 6A. Note in log reference table, STR is a variable indication, but now after the application is executed, the associated variable has been determined, and it is "./xfe9HExoW". Thus log variable 624 stores in the compressed log message entry. In one embodiment, the log variable 624 follows a log variable size field 622, which indicates the size in bytes of the log variable.

The compressed log message entry may also contain a variety of other fields. For example, referring to FIG. 6B, the compressed log message entry contains a field 614 for time stamp, which indicates the time the log entry is created. The precision of the time stamp is important in some embodiments, and the timestamp may indicate the millisecond (ms) or even nanosecond (ns) of the creation time. Traditional log entries often ignore the year of creation, but embodiments of the invention include the year of creation as a part of the time stamp to avoid any cross-year confusion.

The compressed log message entry may also include trace level 618. A trace level identifies the type of logging the particular log entry is associated with. Different type of loggings may be stored at different locations with different sizes. Log files are often stored in memory location referred to log buffers. Different type of loggings may be stored at different log buffers. In one embodiment, the log compression system supports three modes of logging:

Fast mode of logging. Log entries created in fast mode may be stored in a log buffer that is smaller in size, and log entries stored in the log buffer for fast mode may be rewritten quickly (a fast recycle period). The log entry created in fast mode may be considered least important in the hierarchy of the three modes of logging.

Medium mode of logging. Log entries created in medium mode may be stored in a log buffer bigger than that of fast mode, and the log entries stored here may be rewritten slower than that of fast mode.

Slow mode of logging. Log entries created in slow mode may be stored in a log buffer bigger than that of medium mode, and the log entries stored here may be rewritten slower than that of the medium mode. Log entries in slow mode may be considered most important for monitoring application performance and troubleshooting issues.

In one embodiment, the trace level corresponding to the modes of logging is not stored in the compressed log entries. Rather, log encoder 232 determines a trace level of a received log message and stores the resulting compressed log message entry after encoding in a log buffer according to its trace level. In one embodiment, the log buffers are ring buffers and they are written to the log on the disk outside of the log compression system 205 in a periodic manner or when the buffers reach a threshold of buffer size.

The compressed log message entry may also include component identifier 620. A component identifier is associated with the application being monitored through logging. An application is often modular, and contains more than one component (module). A component identifier denotes from which component that the compressed log message entry is generated, which helps to pinpoint a root cause of an issue for example.

In summary, the stored compressed log message entry in FIG. 6B contains size of log record 612, log reference ID 616, time stamp 614, trace level 618, component ID 620, log variable size 622, and log variable 624. Not all the fields are necessary when implementing embodiment of the invention. Some fields may not be implemented, other fields may be added, and fields may be stored in an order other than illustrated. FIG. 7B illustrates another compressed log message entry containing fields 710-724. The compressed log message entry in FIG. 7B contains an additional field log ID 712, which uniquely identifies the compressed log message entry in the compressed log file 234. Also, the compressed log message entry contains two log variable values with corresponding log variable types indications. A compressed log message entry may contain one or more variables and they can all be stored using log variable type and log variable value pairs.

Once the log messages are compressed and stored in compressed log file, they may be decoded later upon request. FIG. 5 is a block diagram illustrating a compressed log decoding process according to one embodiment of the invention. Task boxes 1 to 3 illustrate the order in which operations are performed according to one embodiment of the invention. Log compression system 205 in FIG. 5 is the same log compression system 205 in FIG. 2 and the same or similar references indicate elements or components having the same or similar functionalities. Some connections between various entities and modules not essential to the discussion are omitted in FIG. 5 to leave space to discuss the reference creation process more clearly.

At task box 1, upon receiving a request to decode compressed log file 234, compressed log file is utilized by compressed log decoder 242. At task box 2, through referring to log reference 224, compressed log decoder 242 decodes the compressed log file. Then at task box 3, the decoded log file is sent to an interface for uncompressed log.

FIG. 6B illustrates an example of compressed log message entry decoding at reference 650. The information in the compressed log message entry is extracted, and referring to log reference, the compressed information is decoded. Thus the decoded compressed log message entry contains decoded time stamp 652, which indicates the time the log message was created, with precision to nanoseconds. The decoded trace level is included at reference 654, along with decoded component ID at reference 656. The decoded log string is illustrated at reference 658, where the log reference ID 2 in the compressed log message entry refers to the log reference table, and decoded as "Can't create transcript file: STR" and the variable indication STR within log strings corresponding to the log reference ID 2 is replaced with the stored variable "./xfe9HExoW"

FIG. 7B illustrates another example of compressed log message entry decoding at reference 750. Because the compressed log file in FIG. 7B is encoded differently from the one in FIG. 6B, the decoded log message entry is different too. Referring to FIG. 7B, the decoded log entry contains a decoded log ID at reference 751 and also decoded time stamp 752. The log reference 716 in the compressed log message entry refers to log reference ID 124, which corresponds to "Sendmail[INT]: Can't create transcript file STR: Permission Denied" in the log reference table, thus the decoded log string includes the log string with the variables at reference 720 ("21601") and 724 ("./xfe9HExoW") in the compressed log entry inserted to replace the variable indication "INT" and "STR". Thus, the decoded log strings including variables is "Sendmail[2160]: Can't create transcript file: ./xfe9HExow: Permission Denied" at reference 754.

FIG. 8 is a flow diagram illustrating a log compression process according to one embodiment of the invention. Method 800 may be implemented at log compression system 205 at FIG. 2.

Referring to FIG. 8, the method starts at reference 802, where a log compression system maintains a log reference table, which has a number of log reference entries. Each log reference entry contains a string of characters to be recited repeatedly (more than once) during logging message that are generated from an application during its execution.

At reference 804, the log compression system receives a request for logging a log message initiated from the application during its execution. The log compression system, through a log encoder, creates a compressed log message entry in a compressed log file at reference 806. The compressed log message entry includes at least a timestamp, a log reference identifier, and a log variable portion. The time stamp includes time of creation of the log message with precision in nanoseconds. The log reference identifier identifies one log reference entry without reciting a corresponding string of characters of the log reference entry. The log variable portion contains a part of the log message such as one or more variables generated during execution of the application. Note the log reference entry contains one or more variable indications.

In one embodiment, the compressed log message entry also includes a log trace level indicating a logging mode including one of a fast mode, a medium mode, and a slow mode as discussed herein above. In one embodiment, the compressed log message entry also includes a component identifier indicating an application generating the log message. In one embodiment, the log variable portion includes one or more size indicating a size for each variable included in the compressed log message.

In one embodiment, each log reference entry in the log reference table is created through a log reference creation process at a processing unit such as log reference processor 222 of FIG. 2. The process starts with parsing through one of a number of applications to be executed in a computing system containing the log compression system. The parsing identifies one or more log generating entity within the application. Then the processing unit determines a log pattern of the log generating entity, where the log generating entity contains a string of characters and variable indications. The log pattern then is added to the log reference table as a log reference entry if the log pattern is not already in the log reference table.

In one embodiment, the compressed log message entry is decompressed through a decompression process through a decoding processing unit such as compressed log decoder 242 of FIG. 2. The decompression starts with the decoding processing unit searching for a matching log reference entry in the log reference table based on the log reference identifier of the compressed log message entry. The decoding processing unit then generates a decompressed log message entry including the corresponding string of characters of the matching log reference entry in the log reference table and the log variable portion replacing the one or more variable indications.

Figure 9:
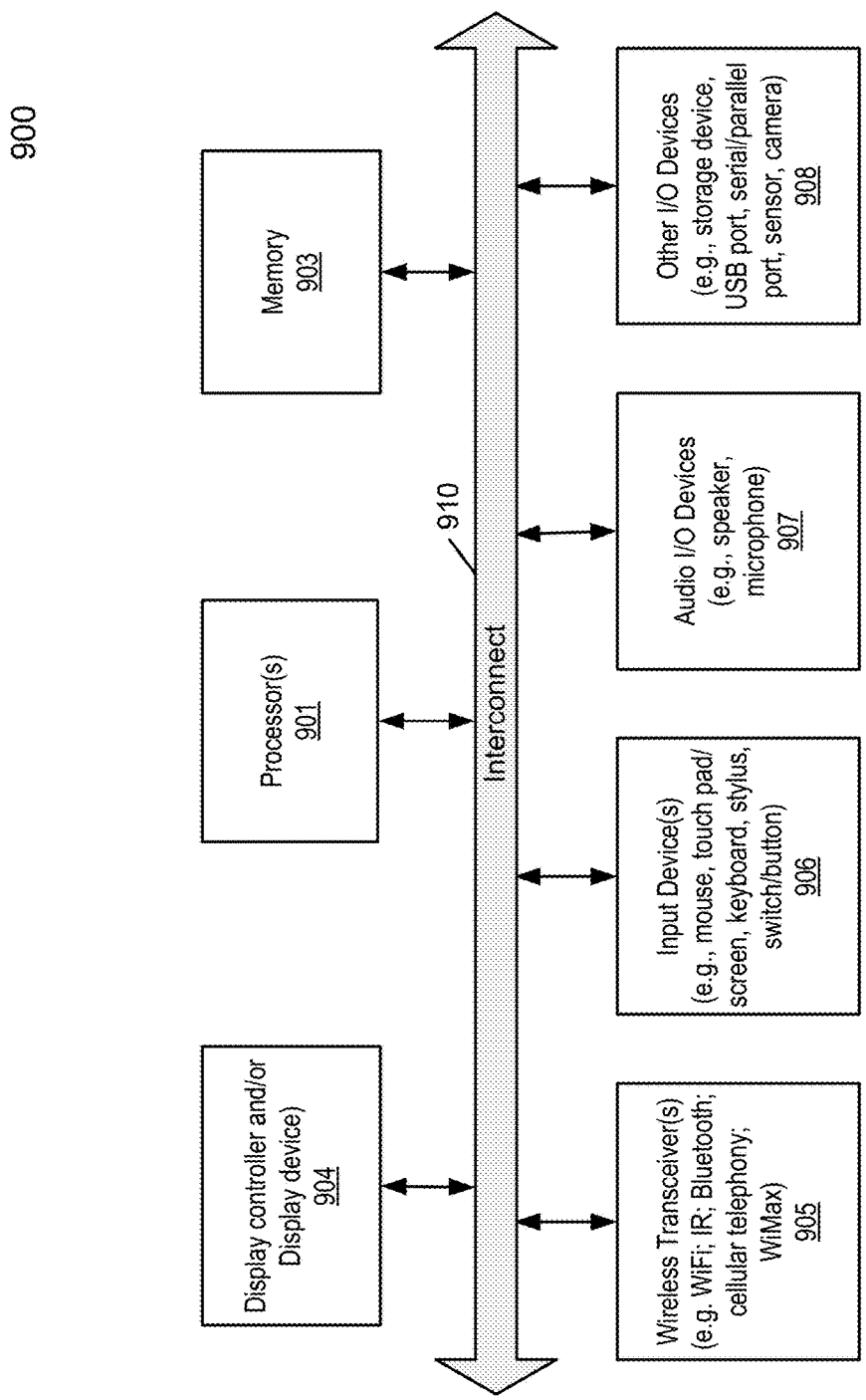
FIG. 9 is a block diagram illustrating an example of a data processing system that may be used with one embodiment of the invention.

FIG. 9 is a block diagram illustrating an example of a data processing system which may be used with one embodiment of the invention. For example, system 900 may represents any of data processing systems described above performing any of the logging processes or methods described above. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901, which may be a low power multi-core processor socket such as an ultra low voltage processor, may act as a main processing unit and central hub for communication with the various components of the system. Such processor can be implemented as a system on chip (SoC). In one embodiment, processor 901 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments. Processor 901 is configured to execute instructions for performing the operations and steps discussed herein. System 900 further includes a graphics interface that communicates with graphics subsystem 904, which may include a display controller and/or a display device.

Processor 901 may communicate with memory 903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 810 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, storage system available from EMC® Corporation of Hopkinton, Mass. Windows® operating system from Microsoft®, Mac OS®/iOS® from Apple, Android® from Google®, Linux®, Unix®, or other real-time or embedded operating systems such as VxWorks.

System 900 may further include IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for compressing log messages, the method comprising:

maintaining, by a log reference processor, a log reference table having a plurality of log reference entries, each containing a string of characters to be recited repeatedly during logging of messages that are generated from an application during its execution, each string of characters describing a predetermined event, wherein maintaining a log reference table includes:

parsing, by the log reference processor, the application to determine a log reference entry not already in the log reference table, and storing the log reference entry in the log reference table; and in response to a request for logging a log message initiated from the application, creating, by a log encoder, a compressed log message entry in a compressed log file, the compressed log message entry including:

a time stamp indicating the time the log message being created, a log reference identifier identifying one of the plurality of log reference entries without reciting a corresponding string of characters of the log reference entry, wherein the one of the plurality of log reference entries contains one or more variable indications, and a log variable portion associated with the log message, wherein the log variable portion contains a part of the log message, wherein the compressed log message is to describe via the identified log reference entry an event that occurred during operations of the application.

2. The computer-implemented method of claim 1, wherein each log reference entry is created through:
  parsing through one of a plurality of applications to identify a log generating entity wherein parsing the application includes parsing the application before run-time.

3. The computer-implemented method of claim 1, wherein the compressed log message entry is decompressed through:
  searching for a matching log reference entry in the log reference table based on the log reference identifier of the compressed log message entry; and
  generating a decompressed log message entry including the corresponding string of characters of the matching log reference entry in the log reference table and the log variable portion replacing the one or more variable indications.

4. The computer-implemented method of claim 1, the compressed log message entry further including:
  a log trace level indicating a logging mode including one of a fast mode, a medium mode, and a slow mode.

5. The computer-implemented method of claim 1, the compressed log message entry further including:
  a component identifier indicating an application generating the log message.

6. The computer-implemented method of claim 1, wherein the log variable portion includes one or more size indication indicating a size for each variable.

7. The computer-implemented method of claim 1, wherein the time stamp includes time of creation with precision in nanoseconds.

8. A log compression system, comprising:
  a processor;
  a memory;
  a log reference table loaded in the memory, the log reference table including a plurality of log reference entries, each containing a string of characters to be recited repeatedly during logging of messages that are generated from an application during its execution, each string of characters describing a predetermined event, the log reference table maintained by operations including:
    parsing the application to determine a log reference entry not already in the log reference table, and
    storing the log reference entry in the log reference table in the memory;
  a compressed log file to store compressed logs of the log compression system; and
  a log encoder executed by the processor, in response to a request for logging a log message initiated from the application, configured to create a compressed log message entry in the compressed log file, the compressed log message entry including:
    a time stamp indicating the time the log message being created;
    a log reference identifier identifying one of the plurality of log reference entries without reciting a corresponding string of characters of the log reference entry, wherein the one of the plurality of log reference entries contains one or more variable indications; and
    a log variable portion associated with the log message, wherein the log variable portion contains a part of the log message, wherein the compressed log message is to describe via the identified log reference entry an event that occurred during operations of the application.

9. The log compression system of claim 8, further comprising a log reference processor configured to create the plurality of log reference entries, wherein each log reference entry is created through:
  parsing through one of a plurality of applications to identify a log generating entity, wherein parsing the application includes parsing the application before run-time.

10. The log compression system of claim 8, further comprising a compressed log decoder configured to decompress the compressed log message entry, the uncompressing comprising:
  searching for a matching log reference entry in the log reference table based on the log reference identifier of the compressed log message entry; and
  generating a decompressed log message entry including the corresponding string of characters of the matching log reference entry in the log reference table and the log variable portion replacing the one or more variable indications.

11. The log compression system of claim 8, wherein the compressed log message entry further include:
  a log trace level indicating a logging mode including one of a fast mode, a medium mode, and a slow mode.

12. The log compression system of claim 8, wherein the log variable portion includes one or more size indication indicating a size for each variable.

13. The log compression system of claim 8, wherein the time stamp includes time of creation with precision in nanoseconds.

14. A non-transitory computer-readable medium having instructions stored therein, which when executed by a processor, cause the processor to perform operations, the operations comprising:
  maintaining a log reference table having a plurality of log reference entries, each containing a string of characters to be recited repeatedly during logging of messages that are generated from an application during its execution, each string of characters describing a predetermined event, wherein maintaining a log reference table includes:
    parsing the application to determine a log reference entry not already in the log reference table; and
    storing the log reference entry in the log reference table; and
  in response to a request for logging a log message initiated from the application, creating a compressed log message entry in a compressed log file, the compressed log message entry including:
    a time stamp indicating the time the log message being created,
    a log reference identifier identifying one of the plurality of log reference entries without reciting a corresponding string of characters of the log reference entry, wherein the one of the plurality of log reference entries contains one or more variable indications, and
    a log variable portion associated with the log message, wherein the log variable portion contains a part of the log message, wherein the compressed log message is to describe via the identified log reference entry an event that occurred during operations of the application.

15. The non-transitory computer-readable medium of claim 14, wherein each log reference entry is created through:

parsing through one of a plurality of applications to identify an log generating entity, wherein parsing the application includes parsing the application before run-time.

16. The non-transitory computer-readable medium of claim 14, wherein the compressed log message entry is uncompressed through:

searching for a matching log reference entry in the log reference table based on the log reference identifier of the compressed log message entry; and generating a decompressed log message entry including the corresponding string of characters of the matching log reference entry in the log reference table and the log variable portion replacing the one or more variable indications.

17. The non-transitory computer-readable medium of claim 14, the compressed log message entry further including:

a log trace level indicating a logging mode including one of a fast mode, a medium mode, and a slow mode.

18. The non-transitory computer-readable medium of claim 14, the compressed log message entry further including:

a component identifier indicating an application generating the log message.

19. The non-transitory computer-readable medium of claim 14, wherein the log variable portion includes one or more size indication indicating a size for each variable.

20. The non-transitory computer-readable medium of claim 14, wherein the time stamp includes time of creation with precision in nanoseconds.

* * * * *